(12) United States Patent
Addepalli (10) Patent No.: US 8,811,158 B1
(45) Date of Patent: Aug. 19, 2014

(54) FAST REROUTE FOR COMMON NETWORK ROUTES

(75) Inventor: Meher Aditya Kumar Addepalli, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 123 days.

(21) Appl. No.: 13/408,189

(22) Filed: Feb. 29, 2012

(51) Int. Cl.
*G01R 31/08* (2006.01)
*H04L 12/56* (2006.01)

(52) U.S. Cl.
CPC ..................................... *H04L 45/28* (2013.01)
USPC ......................................................... 370/225

(58) Field of Classification Search
CPC ..................................................... H04L 35/28
USPC .............................. 370/392, 395.31, 397, 401
See application file for complete search history.

(56) References Cited

U.S. PATENT DOCUMENTS

| | | | |
|---|---|---|---|
| 5,999,536 A * | 12/1999 | Kawafuji et al. ............. | 370/401 |
| 6,976,154 B1 | 12/2005 | Dyckerhoff et al. | |
| 7,184,437 B1 * | 2/2007 | Cole et al. ...................... | 370/392 |
| 7,369,556 B1 * | 5/2008 | Rekhter et al. ................. | 370/392 |
| 7,929,557 B2 | 4/2011 | Kompella | |
| 8,077,726 B1 * | 12/2011 | Kumar et al. .............. | 370/395.31 |
| 2002/0080798 A1 * | 6/2002 | Hariguchi et al. ........ | 370/395.31 |
| 2007/0127502 A1 * | 6/2007 | Zhu ................................ | 370/397 |
| 2010/0329154 A1 * | 12/2010 | Charzinski et al. ........... | 370/255 |

* cited by examiner

*Primary Examiner* — Andrew Chriss
*Assistant Examiner* — Peter Mak
(74) *Attorney, Agent, or Firm* — Shumaker & Sieffert, P.A.

(57) ABSTRACT

In one example, a method includes identifying a plurality of common direct routes to computing devices that are associated with a common indirect route to the computing devices. The method also includes generating a direct route structure that is associated with an entry of a forwarding structure using a next hop list, wherein the next hop list comprises: (1) a reference that identifies the direct route structure, the direct route structure comprising a plurality of direct next hops associated with the common direct routes to computing devices, (2) and an indirect next hop associated with an indirect next hop to the computing devices. The method also includes configuring the next hop list to use the direct route structure to route network data. The method also includes forwarding, by the computing device, network data according to the forwarding structure and the direct route structure.

26 Claims, 6 Drawing Sheets

FAST REROUTE FOR COMMON NETWORK ROUTES

TECHNICAL FIELD

This disclosure relates to computer networks and, more particularly, to techniques for routing packets within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source computing device to a destination computing device. The destination computing device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an incoming packet, the router examines information within the packet to identify the destination for the packet. Based on the destination, the router forwards the packet in accordance with the routing information.

Conventional routers often maintain the routing information in the form of one or more routing tables. The form and contents of the routing tables often depends on the routing algorithm implemented by the router. Common routing algorithms include distance vector routing algorithms and path vector routing algorithms. Many of these algorithms make use of the concept of a "hop," which refers to a connection between two devices. Consequently, the distance between two devices is often measured in hops. Furthermore, in reference to routing a packet, the "next hop" from a network router typically refers to a neighboring device along a given route.

The physical connection between two devices on a network is generally referred to as a link. Many conventional computer networks, including the Internet, are designed to dynamically reroute data packets in the event of a topology change, such as a link failure. Upon a topology change, the routers transmit new connectivity information to neighboring devices, allowing each device to update its local routing information. Links can fail for any number of reasons, such as failure of the physical infrastructure between the devices, or failure of the devices interfacing with the link. The size and complexity of routing information maintained by routers within large networks can be significant. As a result, updating the routing information due to changes in network topology can consume considerable computing resources and substantially delay rerouting of packets.

SUMMARY

In general, techniques are described for performing a fast reroute of network traffic after a change in a network topology, such as a network link failure. For example, techniques are described that make use of a forwarding structure having a hierarchical tree organization, where sub-trees are generated for sets of routes for which a common backup route exists. Sets of routes having a common backup route are identified and grouped, and a separate forwarding sub-tree is generated for the resolving network traffic to individual prefixes within the group of routes. A parent forwarding tree contains forwarding structures that resolve packet keying information, e.g., a destination address, to a next hop node. Where multiple routes exist to a prefix associated with the destination, the next hop node within the parent forwarding tree includes a reference to the corresponding sub-tree for further resolution of the keying information to next hop entries within the sub-tree. In addition to the reference to the sub-tree, the next hop entry within the parent tree contains an identifier for a next hop associated with the common backup route for the group of routes. In the case of link failure or other topology change, the next hop entry in the parent tree is updated to identify the next hop for the common backup route as active over the next hop reference to the sub-tree. In this way, the techniques provide for fast reroute for multiple routes for a network prefix associated with a common backup route, yet provide fine-grain next hop resolution for destinations within the prefix. This may be advantageous where multiple next hop operations may need to be performed on network traffic destined to computing devices that are each associated with a common network prefix.

In one example, a method includes identifying, by a network device, a plurality of common direct routes to computing devices that are associated with a common indirect route to the computing devices. The common direct routes are different routes than the indirect route. The method also includes generating, by the network device, a direct route structure that is associated with an entry of a forwarding structure using a next hop list. The next hop list includes: (1) a reference that identifies the direct route structure, the direct route structure comprising a plurality of direct next hops associated with the common direct routes to computing devices, (2) and an indirect next hop associated with an indirect next hop to the computing devices. The method also includes configuring, by the network device, the next hop list to use the direct route structure to route network data. The method further includes forwarding, by the computing device, network data according to the forwarding structure and the direct route structure.

In one example, a network device includes a control unit having one or more hardware-based microprocessors. The network device also includes a lookup module executable by the microprocessors. The lookup module identifies a plurality of common direct routes to computing devices that are associated with a common indirect route to the computing devices. The common direct routes are different routes than the indirect route. The lookup module generates a direct route structure that is associated with an entry of a forwarding structure using a next hop list, wherein the next hop list comprises: (1) a reference that identifies the direct route structure, the direct route structure comprising a plurality of direct next hops associated with the common direct routes to computing devices, (2) and an indirect next hop associated with an indirect next hop to the computing devices. The lookup module configures the next hop list to use the direct route structure to route network data. The network device also includes a forwarding unit to forward network data according to the forwarding structure and the direct route structure.

In one example, a non-transitory computer-readable medium includes instructions for causing one or more programmable processors to identify a plurality of common direct routes to computing devices that are associated with a common indirect route to the computing devices, wherein the common direct routes are different routes than the indirect route. The instructions also cause the one or more programmable processors to generate a direct route structure that is associated with an entry of a forwarding structure using a next hop list, wherein the next hop list comprises: (1) a reference that identifies the direct route structure, the direct route structure comprising a plurality of direct next hops associated with the common direct routes to computing devices, (2) and an indirect next hop associated with an indirect next hop to the computing devices. The instructions also cause the one or more programmable processors to configure the next hop list to use the direct route structure to route network data. The instructions also cause the one or more programmable processors to forward network data according to the forwarding structure and the direct route structure.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
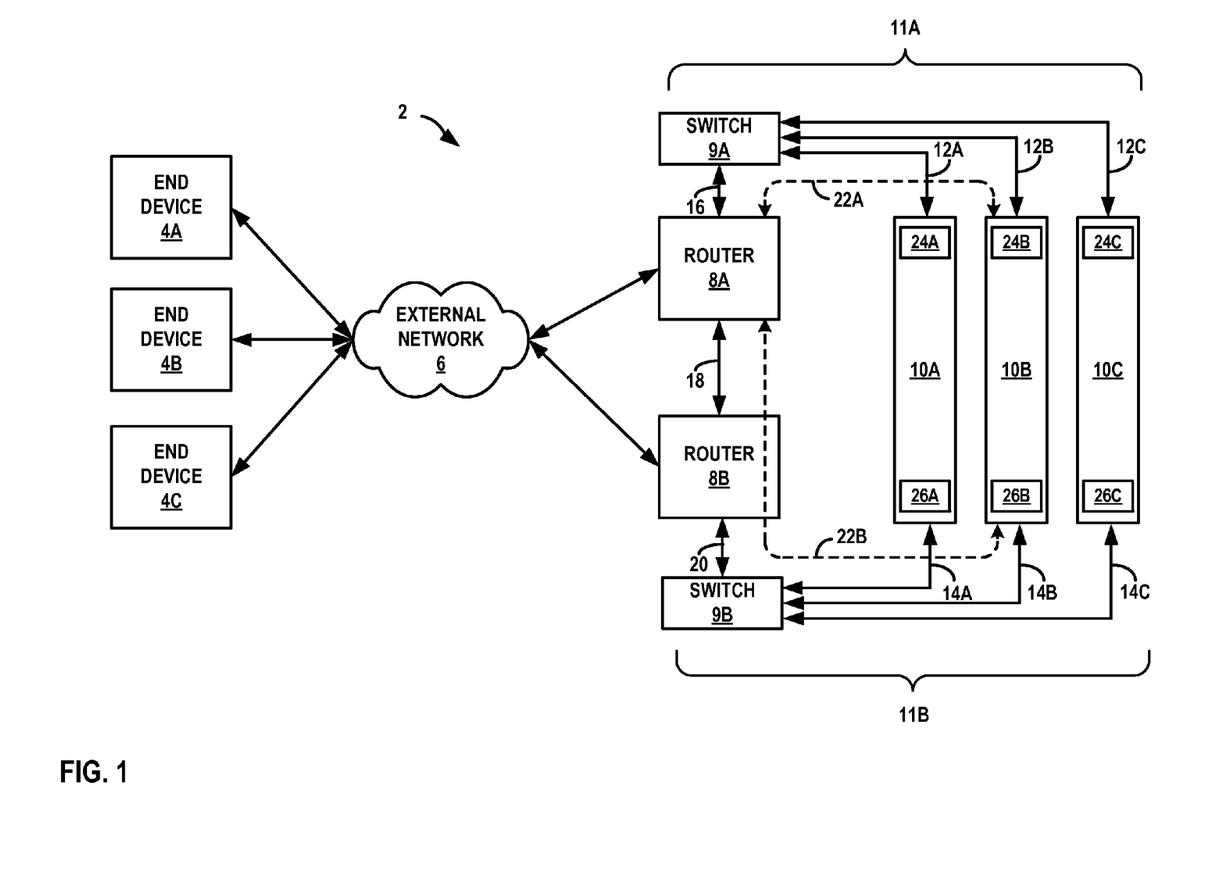
FIG. 1 is a block diagram illustrating an example system in which routers are configured to forward network traffic in accordance with techniques of the disclosure.

FIG. 1 is a block diagram illustrating an example system 2 in which routers 8A-8B ("routers 8"), each connected to external network 6, are configured to forward network traffic (e.g., network packets) in accordance with the techniques of this disclosure. In the illustrated example of FIG. 1, routers 8A and 8B are edge routers that couple a set of servers 10A-10C ("servers 10") to external network 6. In this example, each of routers 8 are coupled to a different layer two (L2) network 11A, 11B via network switches 9A and 9B ("network switches 9"), respectively. In some examples, network switches 9A and 9B are Ethernet switches that transmit L2 network traffic between servers 10 and routers 8. Routers 8 provide connectivity for end devices 4A-4C ("end devices 4") to transmit network traffic with servers 10A-10C using external network 6. External network 6 is typically a packet-based network, such as the Internet.

Examples of servers 10A-10C ("servers 10") include a web server, application server, database server, a data storage system, a supercomputer, or a mainframe computer. Servers 10, for example, may be part of an overall data center accessible via end devices 4A-4C ("end devices 4"). In this example, servers 10 include redundant network interface controllers (NICs) 24A-24C ("NICs 24") and NICs 26A-26C ("NICs 26") that send and receive network packets with network switches 9. In this way, servers 10 are accessible via network 11A or network 11B. Examples of end devices 4A-4C ("end devices 4") include a personal computer, a laptop computer, a handheld computer, a workstation or other client device.

In the example of FIG. 1, router 8A and 8B may be optionally coupled to one another using physical link 18. Routers 8A and 8B may transmit network data between the respective devices using external network 6. Router 8A is coupled to network device 9A using physical link 16, which is further coupled servers 10A-10C using physical links 12A-12C ("physical links 12"). Router 8B is coupled to network device 9B using physical link 20, which is further coupled to servers 10A-10C using physical links 14A-14C ("physical links 14"). Physical links may be a physical medium, such as a copper wire, a coaxial cable, any of a host of different fiber optic lines, or a wireless connection. As such, physical links may fail to transmit network data, for example, due to physical damage to the physical link or network device port failure to which the physical link is coupled. In some examples, physical links couple NICs included in servers 10 to network switches 9. As shown in FIG. 1, physical link 12B, for example, includes a physical link from network device 9A to a NIC 24B of server 10B. Physical link 12B, for instance, similarly includes a physical link from network device 9B to a NIC 26B of server 10B.

In some examples, each of NICs 24 of servers 10 are included in the same layer 2 network associated with router 8A, and therefore, NICs 24 may be included in the same Local Area Network (LAN) (e.g., network 11A). NICs 26 of servers 10 may similarly share a layer 2 network associated with router 8B (e.g., network 11B). Each of NICs 24, in some examples, may also be included in a common layer 3 subnetwork associated with router 8A. A common subnetwork may include one or more NICs that are each associated with layer 3 network addresses (e.g., Internet Protocol (IP) addresses) that share a common network prefix, i.e., a most-significant bit-group of the layer 3 network address.

A unique layer 3 network address is associated with each of NICs 24 of servers 10. For instance, NIC 24A may be assigned an IP address of 192.168.0.1, NIC 24B may be associated an IP address of 192.168.0.2, and NIC 24C may be associated with an IP address of 192.168.0.3. In the present example, the network prefix corresponding to the common subnetwork of NICs 24 may be 192.168.x.x/16. Similarly, router 8B may assign NIC 26A an IP address of 172.16.0.1, NIC 26B may be associated an IP address of 172.16.0.2, and NIC 26C may be associated with an IP address of 172.16.0.1. In the present example, the network prefix corresponding to the common subnetwork of NICs 26 may be 172.16.x.x/16.

Router 8A, as shown in FIG. 1, when initially coupled to router 8B and external network 6, performs path selection to identify network routes from router 8A to servers 10. In one example, router 8A queries other network devices such as router 8B to request routing information. Routing information further specifies network routes from the network devices, such as router 8B, to servers 10. Router 8A, upon receiving the routing information, generates a network topology that indicates the various network routes router 8A may use to forward network traffic to servers 10.

Each network device included in a network route may be referred to as a "hop" and therefore each hop can be represented in forwarding and routing information by a network address of the network device. An adjacent network device to which router 8A, for example, may forward network data is referred to as a "next hop." As shown in FIG. 1, router 8B may be referred to as a next hop in a network route from router 8A to servers 10.

When router 8A has received the routing information and generated a network topology, router 8A performs path selection based on a cost (e.g., number of hops) associated with each network route from router 8A to servers 10. In accordance with techniques of the preset disclosure, router 8A may select a network route with the fewest number of hops as a "direct route." For instance, router 8A may select a next hop in the direct route. Router 8A may also select a different network route to servers 10 as a backup or "indirect route" that includes a greater number of hops to servers 10 than the direct route. While router 8A, in the current example, may select direct and indirect routes based on a number of hops, router 8A in other examples may select direct and indirect routes according to user preference values.

As shown in FIG. 1, router 8A determines during path selection that the number of hops in a network route from router 8A to server 10B using network 11A is less than the number of hops in a network route from router 8A to server 10B using network 11B. Consequently, router 8A selects the network route from router 8A to server 10B using network 11A as direct route 22A. Router 8A further selects the network route from router 8A to server 10B using network 11B as indirect route 22B. Router 8A may initially configure forwarding structures included in router 8A to forward network traffic to server 10B using direct route 22. Router 8A may further configure the forwarding structures to use indirect route 22B to forward network traffic in the event direct route 22 becomes unusable to forward network traffic (e.g., in the event of a link failure).

As shown in FIG. 1, router 8A may implement techniques of the present disclosure to provide fast re-routing of network traffic to servers 10 when one or more direct routes from router 8A to servers 10 fail. For example, techniques are described that make use of a parent forwarding structure having a hierarchical tree organization. The forwarding structure, in some examples, may be a radix tree wherein each leaf node resolves to a subnetwork address. Router 8A may further generate sub-trees for sets of direct routes for which a common backup (e.g., indirect) route exists. For instance, router 8A identifies and groups a set of direct routes that have a common backup route. Router 8A then generates a separate forwarding sub-tree (e.g., direct route structure) for the resolving network traffic to individual prefixes within the group of routes. Each leaf node in the forwarding sub-tree specifies a next hop of one of the direct routes.

The forwarding structure resolves packet keying information, e.g., a destination address, a next hop entry of the forwarding structure associated with a subnetwork. Where multiple direct routes exist to a prefix associated with the destination, the next hop entry within the forwarding structure includes a reference to the corresponding sub-tree for further resolution of the keying information to next hop entries within the sub-tree that correspond to the direct routes. In addition to the reference to the sub-tree, the next hop entry within the parent tree contains an identifier for a next hop associated with the common backup route (or indirect route) for the group of routes. In the case of link failure or other topology change, the next hop entry in the parent tree is updated to identify the next hop for the common backup route as active over the next hop reference to the sub-tree. In this way, a the techniques provide for fast reroute for multiple routes for a network prefix associated with a common backup route, yet provide fine-grain next hop resolution for destinations within the prefix.

Techniques are now described with respect to FIG. 1. In accordance with techniques of the present disclosure, router 8A groups direct routes that share a common subnetwork together in a direct route structure. A forwarding structure includes entries that are each associated with different subnetworks. In accordance with techniques of the disclosure, an entry of the forwarding structure may reference a next hop list that specifies (1) the direct route structure associated with the subnetwork of the entry and (2) a corresponding indirect route that router 8A uses to route network traffic when a direct route fails.

Techniques of the present disclosure group direct routes together that share a common layer 2 subnetwork thereby enabling router 8A, upon determining that the common layer 2 network of the direct routes has failed, to quickly re-route network traffic using a corresponding indirect route. Grouping direct routes together that share a common subnetwork rather than associating each direct route with a corresponding indirect route may enable router 8A to re-route network traffic by updating a single next hop list associated the common subnetwork. In this way, techniques of the disclosure router 8A avoids updating multiple next hop lists associated direct routes by providing next hop lists that include one-to-many rather than one-to-one associations between each direct route and indirect route.

In the current example of FIG. 1, router 8A includes routing information that indicates direct routes from router 8A to servers 10 using network device 9A and indirect routes from router 8A to servers 10 using router 8B and network device 9B. As shown in FIG. 1, router 8A is initially configured to route network traffic from end devices 4 to servers 10 using direct routes (e.g., direct route 22A) that include network device 9A and physical links 16 and 12. Router 8A may further be configured to route traffic using the indirect routes (e.g., indirect route 22B) that include router 8B and network device 9B when a direct route fails.

In the current example, router 8A may determine a failure event (e.g., a physical link failure or router port failure due to error in the port, physical interface card (PIC), line card, etc.) that prevents router 8A from transmitting network traffic between router 8A and servers 10. In response to such an event, router 8A determines that it can no longer send network traffic to servers 10 using direct routes specified by the direct route structure that is associated with the forwarding structure of router 8A. Consequently, when router 8A receives a network packet destined to, for example, server 10B, router 8A identifies in the forwarding structure an entry that is associated with a subnetwork that matches the destination network address of the network packet. Upon identifying the entry, router 8A selects the next hop list associated with the entry of the forwarding structure. Router 8A then configures the next hop list to use the indirect route to forward the network packet to servers 10. By grouping direct routes that are associated with a common subnetwork together, router 8A re-configures only a single next hop list to re-route any network traffic destined to servers 10 in the event of a failing event. In this way, when the direct route from router 8A to servers 10 fails, router 8A may quickly re-route network traffic using an indirect route.

Figure 2:
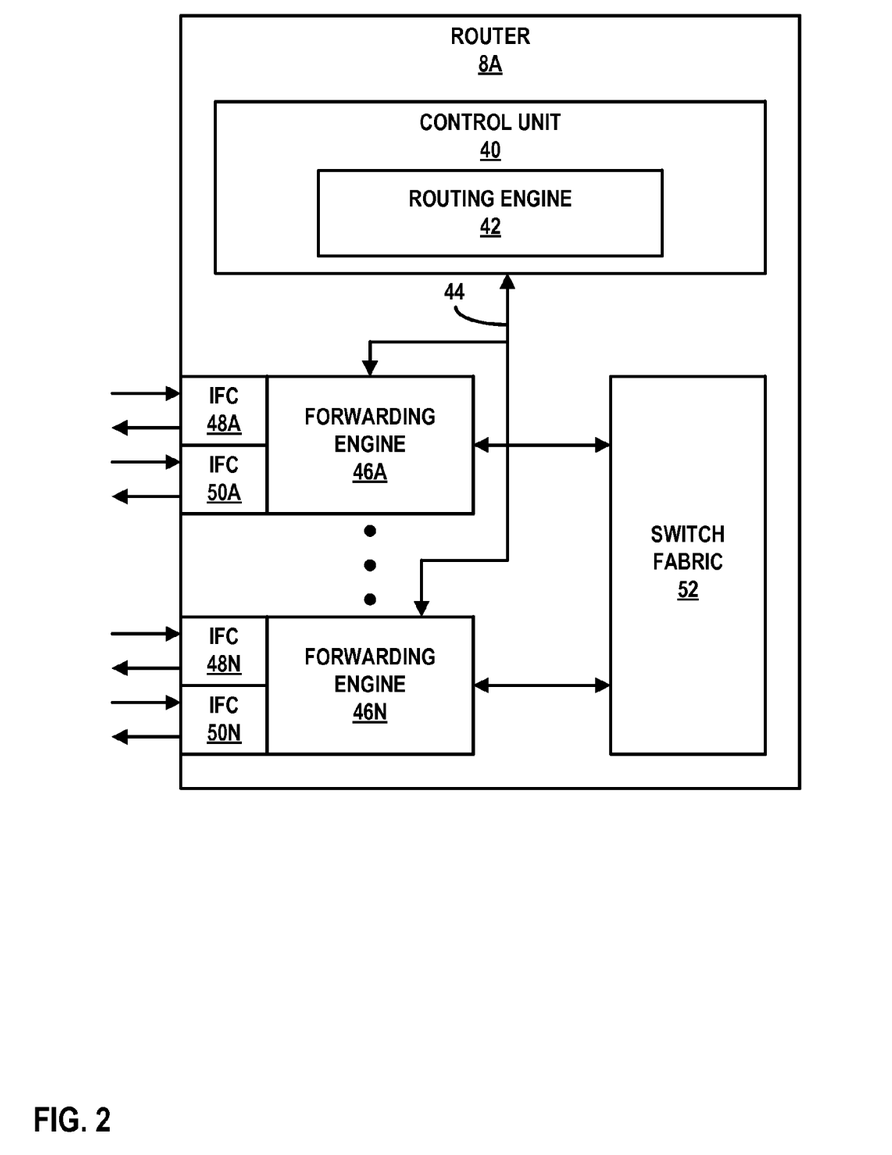
FIG. 2 is a block diagram illustrating an example embodiment of a router in accordance with techniques of the disclosure.

FIG. 2 is a block diagram illustrating an example router 8A that reroutes network packets in accordance with the techniques described herein. Router 8A, in some examples, may comprise a router such as router 8A of FIG. 1, a core router, or other network device. In this example, router 8A includes a control unit 40 that includes a routing engine 42 that provides control plane functionality for router 8A. Router 8A also includes a plurality of packet-forwarding engines 46A-46N ("PFEs 46") and a switch fabric 52 that collectively provide a data plane for forwarding network traffic. PFEs 46 receive and send data packets via interface cards 48A-48N ("IFCs 48") and IFCs 50A-50N ("IFCs 50"). In other embodiments, each of PFEs 46 may comprise more or fewer IFCs. Although not shown, PFEs 46 may each comprise a central processing unit (CPU) and a memory. Switch fabric 52 provides a high-speed interconnect for forwarding incoming data packets to the correct one of PFEs 46 for transmission over a network. In some examples, multiple PFEs may be hosted on a line card, which have one or more processors and memory. The one or more processors and memory may maintain a pool of PFEs, each PFE comprising one or more application-specific integrated circuits (ASICs).

Routing engine 42 provides control plane functions for storing network topology in the form of routing tables or other structures, executing routing protocols to communicate with peer routing devices and maintain and update the routing tables, and providing a management interface to allow user access and configuration of router 8A. Control unit 40 provides an operating environment for routing engine 42 and may be implemented solely in software, or hardware, or may be implemented as a combination of software, hardware or firmware. For example, control unit 40 may include one or more processors which execute software instructions. In that case, routing engine 42 may include various software modules or daemons (e.g., one or more routing protocol processes, user interfaces and the like), and control unit 40 may computer-readable storage medium, such as computer memory or hard disk, for storing executable instructions.

Routing engine 42 is connected to each of PFEs 46 by a dedicated internal communication link 44. For example, dedicated link 34 may comprise a 200 Mbps Ethernet connection. Routing engine 42 maintains routing information that describes a topology of a network, and derives a forwarding information base (FIB) in accordance with the routing information. In general, the routing information represents the overall topology of the network. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, the FIB is generated based on selection of certain routes within the network and maps packet key information (e.g., destination information and other select information from a packet header) to one or more specific next hops and ultimately to one or more specific output interface ports of IFCs 48, 50. Routing engine 42 may generate the FIB in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

Routing engine 42 communicates data representative of a software copy of the FIB into each of PFEs 46 to control forwarding of traffic within the data plane. This allows the software FIB stored in memory (e.g., RAM) of in each of PFEs 46 to be updated without degrading packet-forwarding performance of router 8A. In some instances, routing engine 42 may derive separate and different software FIBs for each respective PFEs 46. In addition, one or more of PFEs 46 include application-specific integrated circuits (ASICs) (not shown) that PFE 46 programs with a hardware-copy of the FIB based on the software FIBs (i.e., hardware versions of the software FIBs) copied to each respective PFE 46. In some examples, a forwarding unit includes one or more ASICs.

As described herein, the hardware FIBs within the forwarding ASICs are dynamically programmed by control logic on PFEs 46 to include entries that each include a pointer to internal structures within the ASICs, where each of those structures are programmed to store data that specifies (1) an identifier for a physical interface port of IFCs 40 of router 8A to be used to reach a direct route, and (2) an identifier for a different interface port of IFCs 50 of router 8A used to reach an indirect route in the event of a network failure.

In addition, the control logic within each PFE 46 programs entries in the hardware FIB so as to associate each entry with one of a plurality of selector blocks within the ASIC, where each selector block includes circuitry configured to reflect the status of the physical link and/or interface port to which a network route is assigned. For example, the selector block may be written by a selection software module executing on a microprocessor within a packet-forwarding engine (PFE) of the router that detects the state of the link and writes a corresponding value to the selector block. The selector block provides an output value that indicates to control logic on a line card which physical interface port to use when forwarding packets to either an interface port associated with a direct route or an interface port associated with an indirect route. Upon detecting a link failure, the control logic of the forwarding engine reprograms the selector block of the ASIC to reflect the status change, i.e., that the corresponding physical link has failed. PFE 46, upon detecting the link failure for a direct route, may automatically update a next hop list used to resolve the direct route such that PFE 46 uses an indirect route specified by a next hop list to route network traffic.

Figure 3:
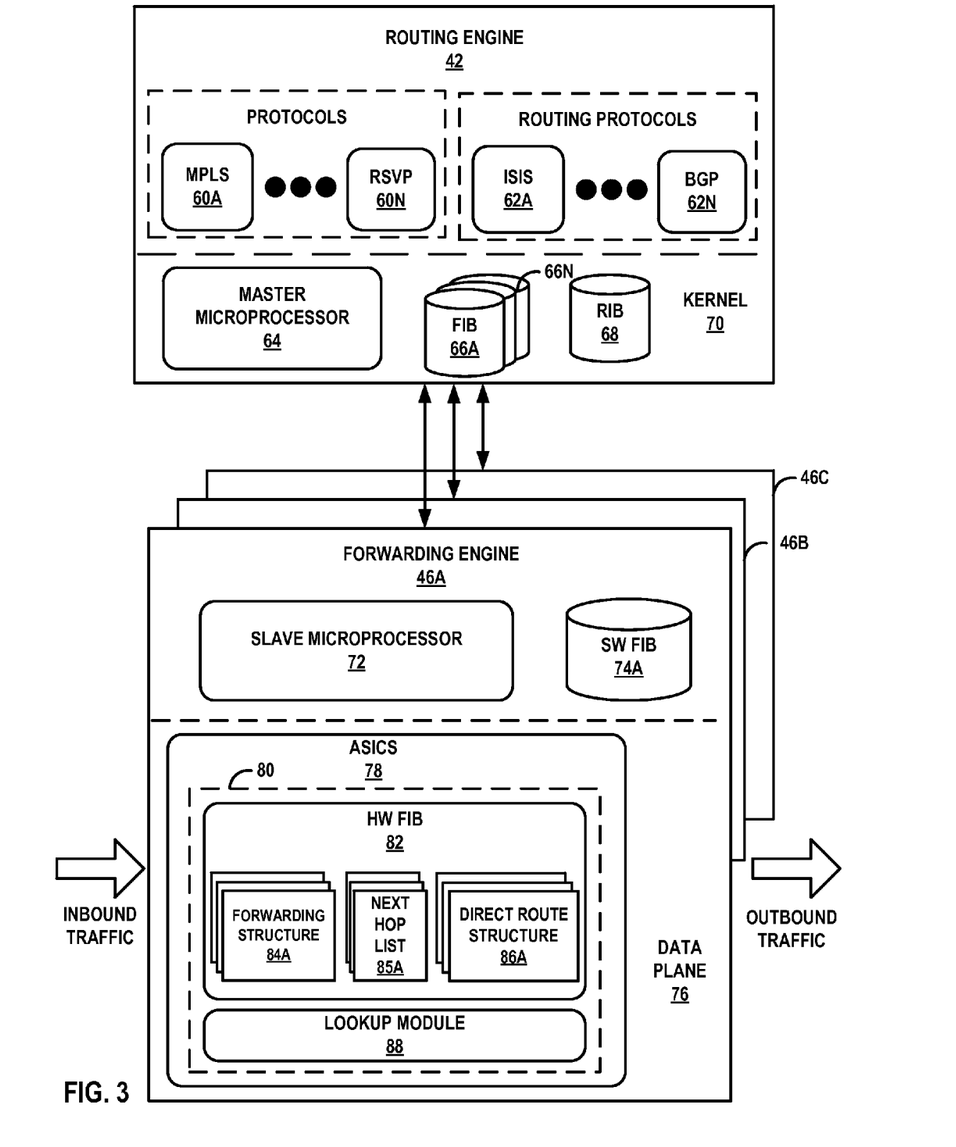
FIG. 3 is a block diagram illustrating a routing engine and a packet-forwarding engine of the router of FIG. 2 in further detail.

A next hop list as described in FIG. 3, for example, may specify an indirect route to destination computing devices and a direct route structure that includes a group of direct routes to the destination computing devices that share a common subnetwork. The next hop list may specify an active element that causes PFE 46 to send network traffic destined to the destination computing devices using the indirect route or the direct routes. For example, if the active element is set to the direct route structure, PFE 46A sends network traffic destined to the destination computing devices using the direct routes. If the active element is later changed to the indirect route, PFE 46A sends the network traffic destined to the computing devices using the indirect route specified by the next hop list.

In accordance with techniques of the present disclosure, to configure PFEs 46, routing engine 42 communicates data representative of a software copy of the FIB to PFEs 46 that includes forwarding information, such as a forwarding structure, next hop list associated with an entry of the forwarding structure, and direct route structure referenced by the next hop list. In one example, PFE 46A is configured, based on the forwarding information, to use IFC 48A to send and receive network packets for direct routes. PFE 46A may further be configured, based on the forwarding information, to use IFC 50A to send and receive network packets destined for the computing devices via an indirect route.

In the current example, a failure event may occur such that network packets destined for the direct routes are no longer forwarded successfully by router 8A. For example, a physical link that transmits network traffic to destination computing devices may fail. Upon determining that the physical link connected to IFC 48A is no longer transmitting network packets, PFE 46 reprograms the selector block of the ASIC (e.g., by rewriting a value within addressable memory in the selector block) to indicate the failure event. In response to determining that the physical link has failed, lookup module 88 may update the next hop list to use the indirect route rather than the direct route. In some examples, reprogramming the next hop list may include changing the active element of the next hop list from the direct route to the indirect route. Consequently, network packets destined for and received from the destination computing devices are transmitted using IFC 50A that is associated with the indirect route.

FIG. 3 is a block diagram illustrating in further detail a routing engine 42 and packet-forwarding engines 46 of the router 8A of FIG. 2. Routing engine 42 may include various protocols 60A-60N, such as MPLS 60A and RSVP 60N. MPLS 60A and RSVP 60N may be used in establishing LSPs within a network that include router 8A as one of the devices along the LSPs. For example, multiple LSPs may be established on each of a plurality of links associated with router 8A.

Routing engine 42 also includes high-level, control plane routing protocols 62A-62N ("routing protocols 62"). In the example of FIG. 3, routing protocols 62 include ISIS 62A and BGP 62N. Routing engine 42 may include other protocols and additional routing protocols not shown in FIG. 3. Routing protocols 60 interact with kernel 70 (e.g., by way of API calls) to update routing information base (RIB) 68 based on routing protocol messages received by router 8A. In response, master microprocessor 64 of kernel 70 generates forwarding information in the form of FIBs 66A-66N based on the network topology represented in RIB 68, i.e., performs route resolution. For example, master microprocessor 64 determines the physical interface port to be used for the forwarding next hops. Master microprocessor 64 of kernel 70 then programs PFEs 46 to install copies of the FIBs as software FIBs 74A-74N.

In this example, ASICs 78 are microcode-controlled chipsets programmably configured by a slave microprocessor 72 executing on each of PFEs 46A-46N (e.g., PFE 46A). Specifically, one or more of ASICs 78 is controllable by microcode 80 programmed by slave microprocessor 72. One example of a router including a packet processing engine having multiple microcode instruction memories is described in U.S. Pat. No. 6,976,154, the entire contents of which are incorporated herein by reference. The slave microprocessor 72 programs a hardware FIB 82 into internal memory of ASICs 78 within the data plane 76 based on software FIB 74A.

As shown in FIG. 3, ASICS 78 of PFE 46A include a lookup module 88. In some examples, control plane functionality of lookup module 88 may be implemented in software and executed by slave microprocessor 72. Lookup module 88 may perform techniques of the present disclosure such as querying forwarding structure 84A and direct route structure 86A when forwarding a packet. Lookup module 88 may also perform techniques such as updating next hop lists that associate forwarding structures 84 with direct route structures 86 in the event of failure event to route network traffic using indirect routes.

Figure 4:
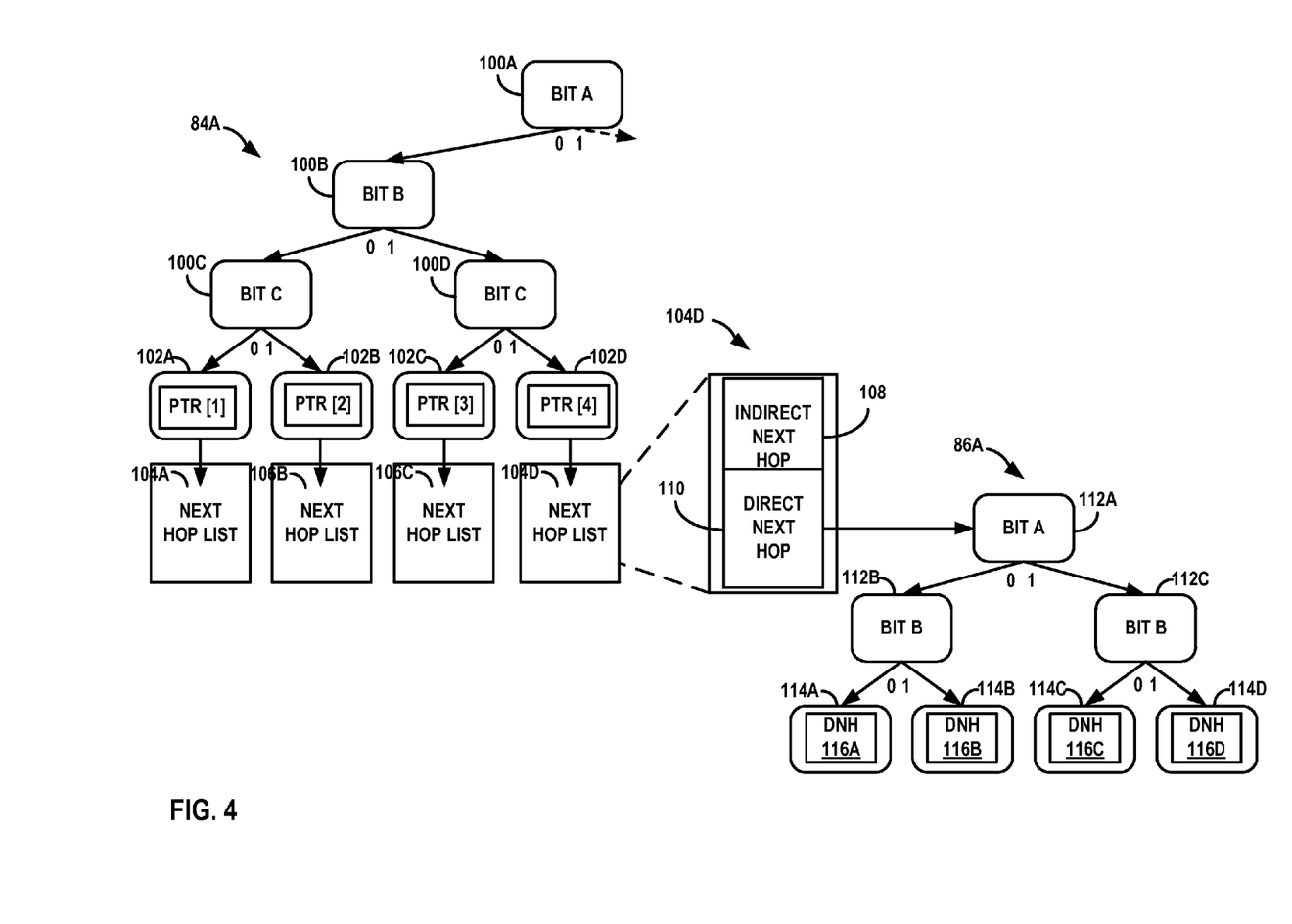
FIG. 4 is a conceptual diagram illustrating a forwarding structure, net hop list, and direct route structure in accordance with techniques of the disclosure.

In some examples, forwarding structures 84 may be implemented as tables, radix trees, or other suitable data structures. As shown in FIG. 4, forwarding structure 84 is illustrated as a radix tree. Lookup module 88, in some examples, uses forwarding structure 84A to select a subnetwork that includes next hop associated with a direct route which will be used to forward a network packet received by PFE 46A. For instance, forwarding structure 84A, in one example, includes one or more entries that are associated with layer 3 network addresses of subnetworks. Each subnetwork may be associated with one or more direct routes and an indirect route that may service traffic to computing devices associated with the direct routes. Each entry in forwarding structure 84A includes a pointer to a next hop list, such as next hop list 85A.

Upon receiving an inbound packet, lookup module 88 reads a block of data corresponding to the packet, referred to as the "key," that includes a layer 3 network address that specifies a network destination of the packet, such as a destination computing device. The key may, for example, contain a routing prefix for the destination computing device. Lookup module 88 initially resolves the key to one of the entries in forwarding structure 84A by traversing forwarding structure 84A. In particular, lookup module 88 traverses forwarding structure 84A by comparing bits of the key with layer 3 network addresses associated with entries of forwarding structure 84A.

In some examples, lookup module 88 may apply a prefix matching technique (e.g., longest prefix match) to the key that compares N highest order bits of the key with N highest order bits of the layer 3 subnetwork address associated with an entry of forwarding structure 84A. In other examples, each entry may be associated the fewest number of bits needed to represent a layer 3 subnetwork address. For example, the 24 highest-order bits of a layer 3 network address may represent a subnetwork while the 8 lowest-order bits may identify individual network devices (e.g., routers, computing devices). Consequently, entries of forwarding structure 84A may be associated with 24-bit layer 3 network addresses that represent subnetworks. In such cases, lookup module 88 may match the 24 highest-order bits of a key with the 24-bit layer 3 network addresses associated with entries in forwarding structure 84. Thus, if forwarding structure 84A and direct route structure 86A are implemented as radix trees, leaf nodes of forwarding structure 84A represent first portions of a network address. Leaf nodes of direct route structure 86A that correspond to direct routes include second portions of network addresses, wherein the second portions do not include the first portions of the network addresses. In this way, forwarding structure 84A and direct route structure 86A may include the fewest number of bits needed to represent a layer 3 address. In any case, based on the value of the key, lookup module 88 identifies a subnetwork associated with an entry of forwarding structure 84A that matches the key. Upon identifying the entry that matches the key, lookup module 88 selects the pointer to the next hop list specified entry, such as next hop list 85A.

In accordance with techniques of the disclosure, each next hop list, e.g., next hop list 85A may specify (1) a direct route structure associated with the subnetwork of an entry in forwarding structure 84A and (2) a corresponding indirect route that router 8A uses to route network traffic when a direct route fails. For instance, next hop list 85A may include a pointer to direct route structure 86A and a layer 3 network address of an indirect route that router 8A may use to forward network traffic to destination computing devices. In some examples, next hop list 84A is implemented as an array, map, object, linked list or other suitable data structure. Each next hop list may also include an active element indicator. The active element indicator may be data that indicates whether lookup module 88 will forward a network packet using a direct route specified by the direct route structure of the next hop list or the indirect route. In one example, the active element indictor may be a bit that is set to "1" or "0" that is associated with the corresponding direct route structure and indirect route. Thus, initially an active element indicator of next hop list 85A may be set to "1" for the direct route structure to indicate that ASICs 78 forward network traffic using the direct routes rather than the indirect route. In the event that lookup module 88 determines a failure event has occurred, lookup module 88 may set the active element indicator to "0" to indicate that ASICs 78 forward network traffic using the indirect route specified by the next hop list.

As shown in FIG. 3, hardware FIB 82 also includes direct route structures 86A. In some examples, direct route structures 86 may be implemented as tables, radix trees, or other suitable data structures. As shown in FIG. 4, direct route structure 86A is illustrated as a radix tree. Lookup module 88, in some examples, uses direct route structures 86A to select a direct route, which will be used to forward a network packet received by PFE 46A. For example, direct route structure 86A may specify one or more direct routes that share a common subnetwork. More particularly, entries in direct route structure 86A may be associated with layer 3 network addresses that represent next hops associated with direct routes. In some examples, an entry in direct route structure 86A may be associated with a default route. Each entry may be associated with a portion of a layer 3 network address that represents a next hop. For instance, an entry in direct route structure 86A may be associated with an 8-bit value that represents the 8 lowest-order bits of a 32-bit layer 3 network address associated with a destination computing device. In the current example, the 24 highest-order bits of a key in a network packet may specify a subnetwork and are therefore resolved by forwarding structure 84A as previously described. Consequently, the 8 lowest-order bits of the key may be resolved by direct route structure 86A.

Based on the 8 lowest-order bits of the key, lookup module 88 searches for a next hop of a direct route associated with an entry of direct route structure 86A that matches the key. If lookup module 88 identifies an entry that matches the 8 lowest-order bits of the key, lookup module 88 selects the next hop of the direct route associated with the entry and ASICS 78 forwards the network packet using the next hop. Alternatively, if lookup module 88 does not identify an entry that matches the 8 lowest-order bits of the key, lookup module 88 selects an entry associated with a default route. If lookup module 88 encounters the default route, lookup module 88 may send a message to routing engine 42 to perform address resolution of the key value. For instance, routing engine 42 may use the Address Resolution Protocol (ARP) to query other network devices connected to router 8A. More specifically, routing engine 42 may send messages the network devices coupled to router 8A requesting a layer 3 network address that is usable by router 8A to forward the network packet. Upon receiving the layer 3 network address, routing engine 42 may update FIB 66A with the network address. Routing engine 42 may cause FIB 66A to be programmed into software FIB 74A. Lookup module 88 may cause slave processor 72 to configure hardware FIB 82 to include the new layer 3 network address. For instance, slave processor 72 may add an entry in direct route structure 86A that is associated with the layer 3 network address. In this way, lookup module 88 may use the default route to add new direct routes to direct route structure 86A.

The following example illustrates a technique lookup module 88 may perform to generate direct route structure 86A. Initially, lookup module 88 may select network addresses assigned to network interfaces associated with forwarding engine 46A. Upon selecting the network addresses assigned to network interfaces, lookup module 88 selects network prefixes of the network addresses, e.g., portions of the network addresses that include N-highest order bits of each of the network addresses. In one example, lookup module 88 then compares a network prefix to network routes included in software FIB 74A. Based on the comparison, lookup module 88 determines whether the network prefix matches a network address of a next hop associated with one of the network routes included in software FIB 74A. If lookup module 88 identifies a match between the network prefix and a network address of a next hop, lookup module 88 selects a direct route structure that corresponds to a subnetwork address that matches the network prefix. Lookup module 88, upon selecting the corresponding direct route structure, includes the network address of the next hop in the direct route structure. For instance, lookup module 88 associates the network address of the next hop with a node of the direct route structure that represents a direct route.

In one example, lookup module 88 initially configures next hop list 85A to use next hops associated with direct routes included in direct route structure 86A to route inbound network traffic to destination computing devices. For instance, the active element indicator of next hop list 85A may indicate that network packets are forwarded to direct routes of direct route structure 86A. Consequently, when ASICS 78 receive an inbound network packet lookup module 88 selects the key from the network packet. The network packet may include a 32-bit layer 3 network address of which the 24 highest-order bits identify a subnetwork and the remaining 8 lowest-order bits identify a destination computing device.

Lookup module 88 compares the 24 highest-order bits of the key to entries in forwarding structure 84A. Upon identifying an entry that matches the key, lookup module 88 selects next hop list 85A associated with the matching entry. Lookup module 88 determines that the active element indicator associated with next hop list 85A is set to direct route structure 86A. Consequently, lookup module 88 compares the 8-lowest order bits of the key to entries in direct route structure 86A. In the current example, lookup module 88 identifies an entry that matches the 8 lowest-order bits of the key and forwards the network packet using the network address of the next hop associated with the entry.

In the current example, slave microprocessor 72 may monitor the status of physical links associated with interfaces of forwarding engines 46A. If a failing event occurs, lookup module 88 may determine that the selector block indicates a change in the status of a physical link. Lookup module 88, in response to determining the change in the status of the physical link, changes the active element indictor of next hop list 85A to use the indirect route associated with the failed physical link. For instance, lookup module 88 may query next hops of direct routes (e.g., layer 3 network addresses) associated with the network interface controller that is coupled to the failed physical link. Upon identifying the direct routes, lookup module 88 may cause slave processor 72 to query forwarding structure 84A to identify next hop lists such as next hop list 85 that match the one or more next hops of direct routes. Lookup module 88 causes slave processor 72 to select the matching next hop lists and changes the active element indictors of the selected next hop lists such that lookup module 88 uses the indirect routes.

When forwarding engine 46 receives a subsequent network packet, lookup module 88 queries forwarding structure 84A to identify an entry associated with a layer 3 subnetwork address that matches the key of the network packet. Upon identifying a matching entry, lookup module 88 selects a corresponding next hop list referenced by the entry. Lookup module 88 may then determine that the active element indicator indicates that ASICS 78 will use the indirect route specified in the next hop list to route the network packet. Consequently, ASCIS 78 route the network packet using the indirect route.

FIG. 4 is a conceptual diagram illustrating a forwarding structure, next hop list, and direct route structure in accordance with techniques of the disclosure. For example, FIG. 4 includes a forwarding structure 84A, next hop list 104D, and direct route structure 86A. As illustrated in FIG. 4, forwarding structure 84A is illustrated as a conceptual representation of forwarding information included in forwarding structure 84A of FIG. 3. Direct route structure 86A is illustrated as a conceptual representation of forwarding information included in direct route structure 86A of FIG. 3.

In some examples, forwarding structure 84A may be a radix tree. The radix tree may include hierarchically arranged nodes that correspond to values of network addresses. In some examples, a leaf node of the hierarchically arranged nodes is associated the subnetwork address that is associated with the entry of the forwarding structure. In some examples, direct route structure 86A may also be implemented as a radix tree. In such examples, a leaf node direct route structure 86A of the hierarchically arranged nodes is associated with a direct route.

In the illustrated example of FIG. 4, forwarding information may be arranged in forwarding structure 84A as a radix tree that associates entries corresponding to network routes with next hop lists 104A-104D (collectively "next hop lists 104"). In one example, next hop list 104D may be next hop list 85A as shown in FIG. 3. More specifically, forwarding structure 84A includes a number of leaf nodes 102A-102D, which may be collectively referred to as "leaf nodes 102." In some examples, leaf nodes of forwarding structure 84A may be referred to as and/or may be said to correspond to an "entry" of forwarding structure 84A. In some examples, leaf nodes 102 correspond to next hop addresses of subnetworks. For large networks, forwarding structure 84A can become sizable and may easily include over one thousand leaf nodes 102. Therefore, for exemplary purposes, FIG. 4 depicts a portion of forwarding structure 84A. The arrangement of forwarding information as a radix tree is illustrated for exemplary purposes. The principles of invention may readily be applied to other arrangements. Forwarding information may be arranged, for example, as a number of tables, link lists, and other data structures that store pointers to next hop lists 104.

In accordance with techniques of the present disclosure, upon receiving an inbound packet, forwarding engine 46A reads a block of data corresponding to the packet, referred to as the "key," that includes a network destination. The key may, for example, contain a routing prefix for another router within the network. Forwarding engine 46A initially resolves the key to one of leaf nodes 100 by traversing forwarding structure 84A. In particular, forwarding engine 46A traverses forwarding structure 84A by sequentially testing bits A, B and C, which represent any bits within the key. Based on the value of each bit A, B, C, forwarding engine 46A follows the links of forwarding structure 60 through the various levels until reaching one of leaf nodes 102.

Leaf nodes 102, in some examples, reference next hop lists 104. In particular, leaf nodes 102 may include pointers to next hop lists 104. In this manner, leaf nodes 102 of forwarding structure 84A may not contain next hop information, but include references to next hop lists 104 that are stored in one or more separate data structures. Each of next hop lists may include an indirect next hop 108 associated with an indirect route and a direct next hop 110 associated with a direct route structure. In some examples, each of indirect next hop 108 and/or direct next hop 110 may be pointers to a next hop associated with indirect route (e.g., layer 3 network address) and direct route structure, respectively. In other examples, indirect next hop 108 and/or direct next hop 110 may include actual data that represents an indirect route and direct route structure. In any case, next hop lists act as intermediate data structures that relate leaf nodes of forwarding structure 84A that represent subnetworks to direct and indirect routes.

Upon resolving a key of an inbound packet to one of leaf nodes 102, for example, leaf node 102D, lookup module 88 selects next hop list 104D that is referenced by leaf node 102D. In the illustrated example, routing engine 8 resolves a packet key of "011" to leaf node 102D. Lookup module 8 uses the pointer contained within leaf node 102D to access next hop list 104D. Upon selecting next hop list 104D, lookup module 88, determines whether the active element indicator associated with next hop list 104D indicates that network traffic will be routed using indirect next hop 108 or direct next hop 110. Indirect next hop 108 may correspond to an indirect route that ASICS 78 may use to route network traffic. In some example, indirect next hop 108 may include a pointer to a value that represents a layer 3 network address of the indirect route. In other examples, indirect next hop 108 may include the actual layer 3 network address of the next hop associated with indirect route. Direct next hop 110 may correspond to a group of direct routes that ASICS 78 may use to route network traffic. In some example, direct next hop 110 may include a pointer to direct route structure 86A, which includes a group of next hops associated with direct routes that share a common subnetwork. In other examples, direct next hop 110 may include actual data of direct route structure 86A.

In the current example, the active element indicator associated with next hop list 104D indicates that network traffic will be routed using direct next hop 110. Direct next hop 110 may include a pointer to direct route structure 86A. Direct route structure 86A may be implemented as a radix tree as shown in FIG. 4. In some examples, lookup module 88 may apply a bit matching technique to compare a group of N lowest-order bits of a key with N lowest order bits representing a layer 3 network that is associated with entry of forwarding structure 84A. Each leaf node 114 of direct route structure 86A may, for example, represent a direct route. Consequently, each leaf node includes layer 3 network address that represents a direct next hop (e.g., direct hops 116A-116D) that corresponds to a direct route. For instance, each of direct next hops 116 may include a layer 3 network address that corresponds to the direct route. In other examples, direct next hops 116 may include pointers to values representing layer network addresses. Thus, based on the value of a network packet key, lookup module 88 selects a direct next hop associated with an entry of direct route structure 86A that matches the key. Upon resolving the key of the network packet to one of direct next hops 116, PFE 46A determines an interface port associated with the direct next hop, and forwards the inbound packet to the appropriate interface for transmission.

As illustrated in FIG. 4, direct routes represented by direct route structure 86A share a common subnetwork. Consequently, if a failure event (e.g., physical link failure) occurs that requires rerouting packets destined to computing devices of the common subnetwork, lookup module 88 can dynamically reroute the packets by switching the active element indicator from direct next hop 110 to indirect next hop 108. Thus, network traffic destined for the computing devices is rerouted by PFE 46A using the indirect route specified by indirect next hop 108. In response to a failure event, router 8A may, therefore quickly reroute packets destined for a direct route of direct route structure 86A to an alternate next hope, e.g., indirect next hop 108.

The following examples of the present disclosure provide techniques for discovering an indirect route that may be configured in a next hop list. For instance, in some examples, routers 8A and 8B may be included in the same Local Area Network (LAN). In such examples, lookup module 88 sends a message to a Routing Information Base (RIB) (e.g., RIB 68) to request a network topology. The network topology may describe a LAN that includes routers 8A and 8B. In some examples, lookup module 88 determines that routers 8A and 8B are associated with the same LAN by comparing layer 3 network addresses associated with network interfaces of routers 8A and 8B. For instance, if portions of the layer 3 network addresses match, lookup module 88 determines that routers 8A and 8B are associated with the same LAN. When routers 8A and 8B are associated with the same LAN, lookup module 88 may send a message to router 8A to request whether a network route exists from router 8A to a destination computing device that includes router 8B. If such a network route exists from router 8A to a destination computing device that includes router 8B, lookup module 88 may include the network route as an indirect route in a next hop list. The next hop list may be associated with a forwarding structure entry that is associated with a subnetwork address matching at least a portion of the network route.

In some examples, routers 8A and 8B may not be associated with the same LAN. Consequently, in some examples, router 8B may include a hardware and/or software module that includes functionality to send a message from router 8B to 8A. The message may indicate a network route from router 8A to a destination computing device that includes router 8B. For instance, an administrator may cause the module on router 8B to broadcast the message to router 8A. When lookup module 88 receives the message from router 8A, lookup module 88 selects the network route included in the message. In some examples, an administrator may provide one or more user inputs that cause lookup module 88 to assign the network route of the message as an indirect route in one or more next hop lists. In this way, lookup module 88 may configure an indirect route for a next hop list when the routers 8A and 8B are not associated with the same LAN.

Figure 5:
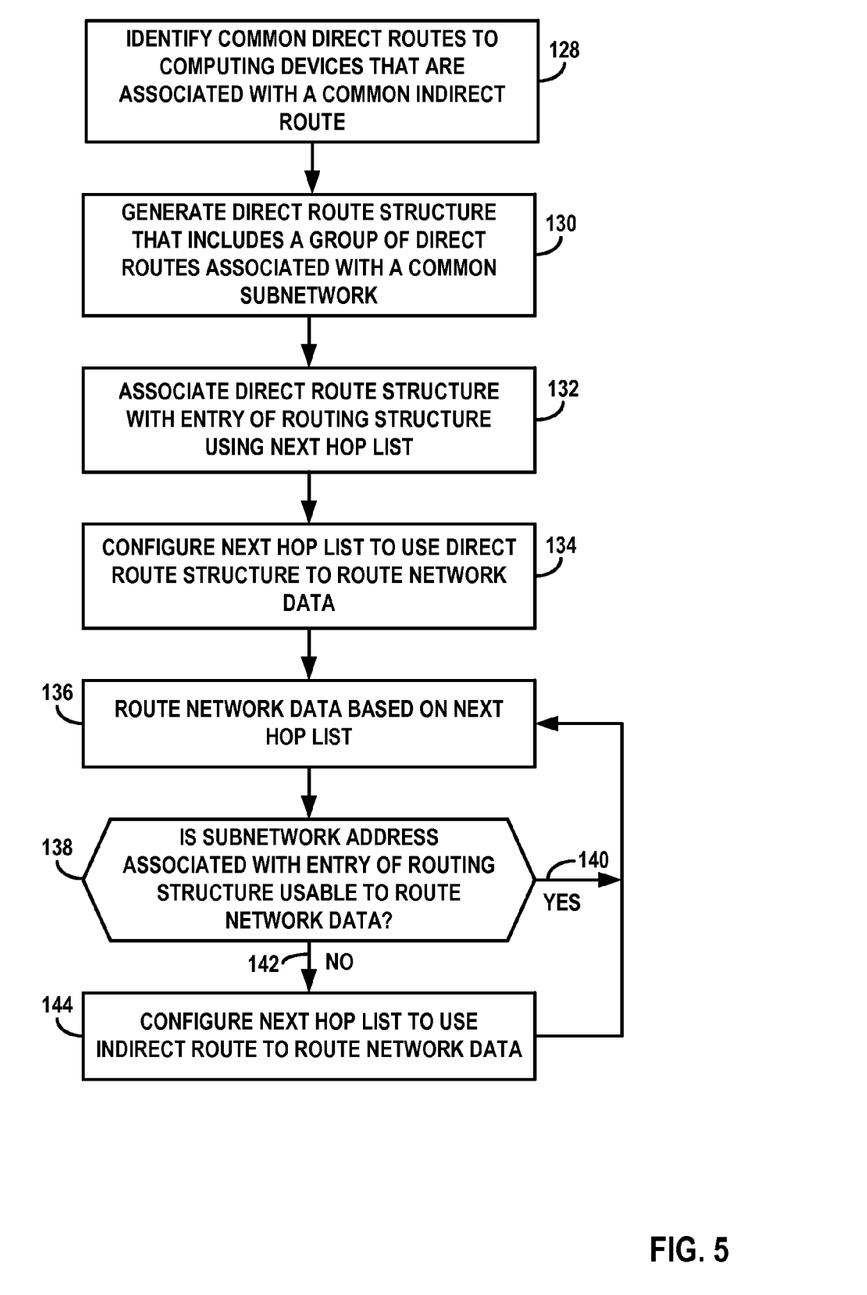
FIG. 5 is a flowchart illustrating an example operation of a lookup module, in accordance with techniques of this disclosure.

FIG. 5 is a flowchart illustrating an example operation of a lookup module, in accordance with techniques of this disclosure. The example operation of FIG. 5 may be performed by lookup module 88 of forwarding engine 46A as shown in FIG. 3. Initially, lookup module 88 identifies common direct routes that share a common backup bath, for example, an indirect route (128). Lookup module 88 generates one or more direct route structures (130). Each direct route structure includes the group of direct routes that are included in a common subnetwork. In some examples, lookup module 88 further generates forwarding structure 84A, as shown in FIG. 3. Forwarding structure 84A may be implemented as a radix tree wherein each leaf node, e.g., entry, corresponds to a subnetwork.

In some examples, lookup module 88 generates one or more next hop lists that associate the direct route structures with entries of forwarding structure 84A (132). For instance, a next hop list may be an array that includes a first pointer to a direct route structure and a second pointer to a value representing an indirect route. To associate an entry of forwarding structure 84A with direct route structure 86A using a next hop list 85A, lookup module 88 may store a pointer in an entry of forwarding structure 84A that references next hop list 85A. Next hop list 85A further includes a pointer that points to direct route structure 86A. In the current example, direct routes specified in direct route structure 86A each share a common subnetwork associated with the entry of forwarding structure 84A that references next hop list 85A.

Lookup module 88, in some examples, configures next hop list 85A to use next hops associated with common direct routes indicated by direct route structure 86A to route network data (134). For instance, lookup module 88 configures an active element indicator associated with next hop list 85A to route network data using direct routes specified by direct route structure 86A. Consequently, as forwarding engine 46A receives inbound network data, lookup module 88 determines that next hop list 85A specifies the network data is to be routed using direct routes of direct route structure 86A and forwards the network data accordingly (136).

In some examples, lookup module 88 determines whether a subnetwork associated with an entry of forwarding structure 84A is usable to route network data to computing devices associated with the subnetwork (138). For instance, lookup module 88 may determine that a failure event has occurred such that forwarding engine 46A cannot forward network data using direct routes included a subnetwork that is associated with an entry of forwarding structure 84A. If lookup module 88 determines that a failure event has occurred (142), lookup module 88 identifies the entry of forwarding structure 84A associated with the subnetwork (142). Upon identifying the entry, lookup module 88 configures the next hop list associated with the selected entry (e.g., next hop list 85A) to use the indirect route specified in the next hop list to route network data (144). For instance, lookup module 88 may set the active element indicator associated with next hop list 85A to use the indirect route specified by next hop list 85A. Lookup module 88 may then route network data using the indirect route based on the updated next hop list (136).

In some examples, lookup module 88 may determine that a subnetwork associated with an entry of forwarding structure 84A is usable to route network data to computing devices associated with the subnetwork (140). In such examples, look module 88 may use the next hop list that corresponds to the subnetwork to route network data (136). For example, lookup module 88, upon receiving a network packet to forward, selects an entry of forwarding structure 84A associated with subnetwork that matches the key of the network packet. Lookup module 88, upon selecting the entry, further selects the next hop list associated with the entry. The next hop list in the current example is associated with an active element indicator that indicates lookup module 88 will forward network packet using a direct route included in a direct route structure referenced by the next hop list. Lookup module 88 may select a next hop associated with a direct route of the direct route structure based on the key of the network packet. Forwarding engine 46A then forwards the network packet using the selected direct route.

In some examples, techniques of the present disclosure may be applied to Multi-protocol Label Switching (MPLS). MPLS is a mechanism used to engineer traffic patterns within Internet Protocol (IP) networks. By utilizing MPLS, a source device can request a path through a network, i.e., a Label Switched Path (LSP). An LSP defines a distinct path through the network to carry MPLS packets from the source device to a destination device. In some examples, multiple hops may be included in the LSP. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

In some examples, techniques may be implemented lookup module 88 to provide fast re-routing when a failure event occurs. In such examples, an MPLS network may specify that MPLS labels map to network routes. One example of such techniques is described in described in U.S. patent application Ser. No. 12/403,496, entitled "SUMMARIZATION AND LONGEST-PREFIX MATCH WITHIN MPLS NETWORKS." by Kireeti Kompella et al., filed Mar. 13, 2011, incorporated herein by reference.

In one example, routers 8A and 8B of FIG. 1 may be included in an MPLS network. Lookup module 88 may maintain a label space to provide a summarized mapping of layer 3 network addresses to labels or label ranges. A first portion of an MPLS label (e.g., N highest-order bits) may correspond to a label space. The label space may include multiple LSPs. Consequently, a second portion of the MPLS label (e.g., M lowest-order bits) may identify individual LSPs. An individual MPLS label may therefore specify an LSP. In one example, the first and second portions of the MPLS label may be different portions of the label.

In accordance with techniques of the disclosure, router 8A and 8B, as previously described, may maintain mappings between MPLS labels and network routes. Consequently, an MPLS label space that includes multiple MPLS label values may be mapped to a group of network routes. In some examples, the group of network routes is included in a common subnetwork. Lookup module 88 may, in some examples, generate a direct route structure that is associated with an entry of a forwarding structure. The entry of the forwarding structure is associated with a portion of a MPLS label, for example, the N-highest order bits of an MPLS label. The entry of the forwarding structure may therefore represent an MPLS label space.

In some examples, lookup module 88 associates the direct route structure with an entry of the forwarding structure using a next hop list. The direct route structure may include a plurality of LSPs that are associated with the common MPLS label space. Each of the LSPs in the plurality of LSPs may be associated MPLS labels that match potions of the MPLS label space. The next hop list may also specify an indirect LSP. The indirect LSP may be an LSP from router 8A to server 10B that is associated with a MPLS label that does not match a portion of the MPLS label space associated LSPs of the direct route structure.

In one example, lookup module 88 configures the next hop list to route network packets using the direct route structure. When forwarding MPLS packets, lookup module 88, in some examples, performs a longest-prefix match that compares a portion of an MPLS label associated with a network packet to entries of the forwarding structure. When lookup module 88 identifies a match, lookup module 88 selects the matching entry. The matching entry of the forwarding structure may include a reference to the next hop list. Lookup module 88 determines that the direct route structure is used to route the network packet. Consequently, lookup module 88 queries the direct route structure to determine whether a match exists between a portion of the MPLS label associated with the network packet and an MPLS label associated with one of the LSPs included in the direct route structure. If lookup module 88 determines that a match exists, router 8A forwards the network packet using the LSP that matches the MPLS label associated with the network packet.

In some examples, a failure event may occur such that network routes associated with the LSPs of the direct route structure are not useable to route network data. Consequently, lookup module 88 may identify the next hop list associated with the direct route structure and set the next hop list to route network data using the indirect LSP specified by the next hop list. Router 8A may use the indirect LSP to route subsequent network traffic that include MPLS labels matching the MPLS label space of the direct route structure.

Figure 6:
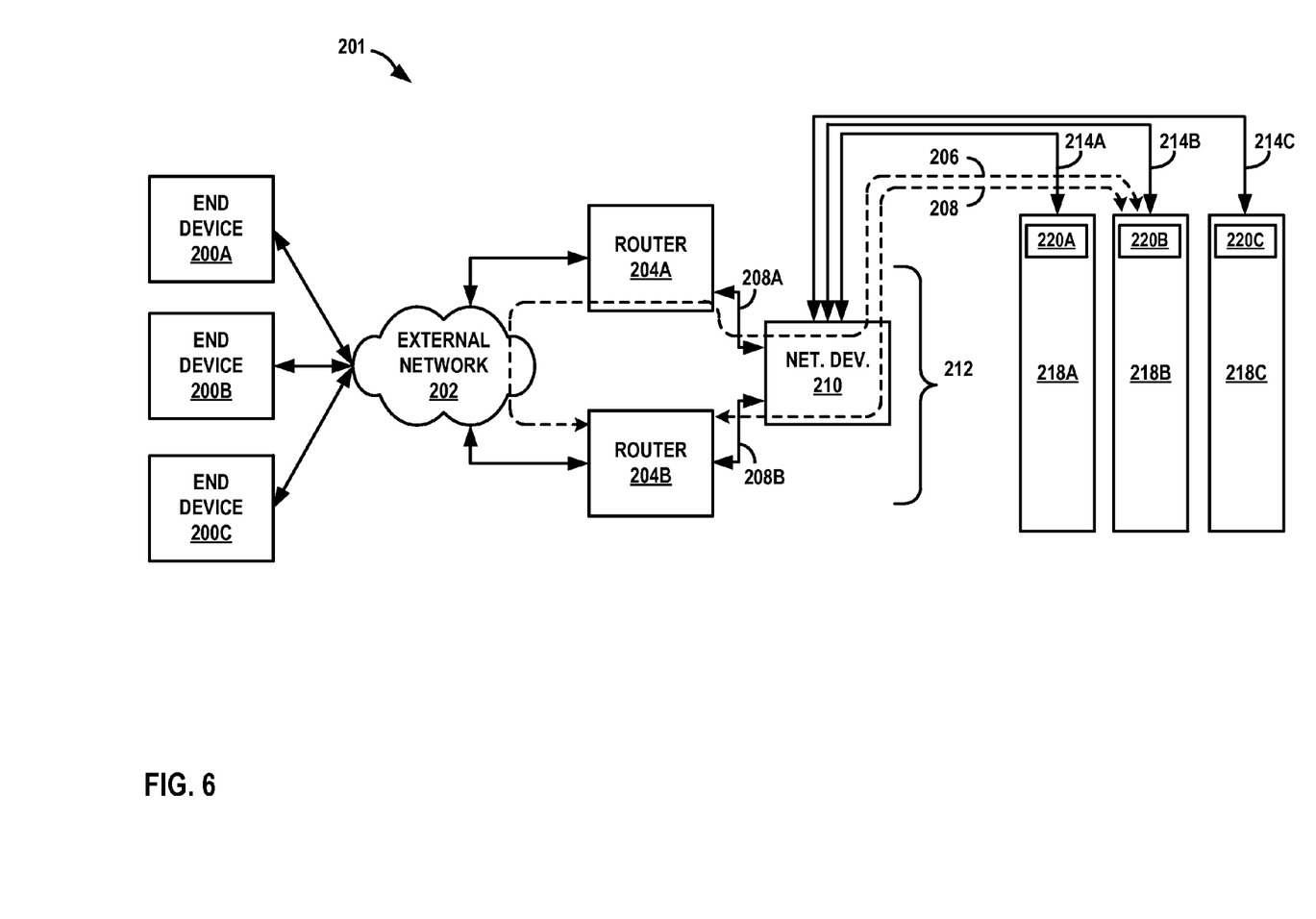
FIG. 6 is a block diagram illustrating an example system in which routers, each connected to an external network, are configured to forward network traffic in accordance with the techniques of this disclosure.

FIG. 6 is a block diagram illustrating an example system 201 in which routers 204A-204B ("routers 204"), each connected to external network 202, are configured to forward network traffic (e.g., network packets) in accordance with the techniques of this disclosure. In the illustrated example of FIG. 6, routers 204A and 204B are edge routers that couple a set of servers 218A-218C ("servers 218") to external network 202. In this example, each of routers 204 are coupled to servers 218 using a layer two (L2) network 212 via network device 210. In some examples, network device 210 is an Ethernet switch that transmits L2 network traffic between servers 218 and routers 204. Routers 204 provide connectivity for end devices 200A-200C ("end devices 200") to transmit network traffic with servers 218A-218C using external network 202. External network 202 is typically a packet-based network, such as the Internet.

In the example of FIG. 6, servers 218 include network interface controllers (NICs) 220A-220C ("NICs 220") that send and receive network packets with network device 210. In this way, servers 218 are accessible via multiple network routes. In the example of FIG. 6, router 204A and 204B are operative coupled such that routers 204 may communicate using external network 202 and network device 210. Router 204A is coupled to network device 210 using physical link 208A. Network device 210 is further coupled servers 220A-220C using physical links 214A-214C ("physical links 214"). Router 204B is coupled to network device 210 using physical link 208B, which is further coupled to servers 218A-218C using physical links 214A-214C ("physical links 214"). As shown in FIG. 6, physical link 214B, for example, includes a physical link from network device 210 to a NIC 220B of server 218B.

In some examples, each of NICs 220 of servers 218 are included in a common layer 3 subnetwork associated with routers 204A and 204B, and therefore, NICs 220 may be included in the same Local Area Network (LAN) (e.g., network 212). A common subnetwork may include one or more NICs that are each associated with layer 3 network addresses (e.g., Internet Protocol (IP) addresses) that share a common network prefix, i.e., a most-significant bit-group of the layer 3 network address.

Router 204B, as shown in FIG. 6, coupled to router 204A and external network 202, performs path selection to identify network routes from router 204B to servers 218. In one example, router 204B queries other network devices such as router 204A to request routing information. For instance, routing protocols used on routers 204 may export a network prefix associated with router 204B to router 204A using external network 202 and/or network device 210. Routing information further specifies network routes from the network devices, such as router 204B, to servers 218. Router 204B, upon receiving the routing information, generates a network topology that indicates the various network routes router 204B may use to forward network traffic to servers 218A. As shown in FIG. 1, router 204A and other network devices included in external network 202 may be referred to as next hops in a network route from router 204B to servers 218. Router 204B may determine the presence of each of servers 218 on network 212 when servers 218 and router 204B are associated with a common subnetwork using physical link 208B. Router 204A may determine the presence of each of servers 218 on network 212 when servers 218 and router 204A are associated with a common subnetwork using physical links 208A and 214.

Router 204B may receive routing information and generate a network topology to perform path selection based on a cost (e.g., number of hops) associated with each network route from router 204B to servers 218. In one example router 204B may determine that the network prefix associated with network 212 is accessible by physical links 208B. Router 204B may also determine, based on a network prefix exported by router 204A that the network prefix is also accessible using external network 202 and physical links 208A and 214. In accordance with techniques of the preset disclosure, router 204B may select a network route with the fewest number of hops as a "direct route." Router 204B may also select a different network route to servers 218 as a backup or "indirect route" that includes a greater number of hops to servers 218 than the direct route. While router 204B, in the current example, may select direct and indirect routes based on a number of hops, router 204B in other examples may select direct and indirect routes according to user preference values.

As shown in FIG. 6, router 204B determines during path selection that the number of hops in a network route from router 204B to server 220B using physical link 208B is less than the number of hops in a network route from router 204B to server 22B using physical link 208A and external network 202. Consequently, router 204B selects the network route from router 204B to server 218B using physical link 208B as direct route 208. Router 204B further selects the network route from router 204B to server 220B using physical link 208A as indirect route 206. Router 204B may initially configure forwarding structures included in router 204B to forward network traffic to server 220B using direct route 208. Router 204B may further configure the forwarding structures to use indirect route 206 to forward network traffic in the event direct route 208 becomes unusable to forward network traffic (e.g., in the event of a link failure).

As shown in FIG. 6, router 204B may implement techniques of the present disclosure to provide fast re-routing of network traffic to servers 218 when one or more direct routes from router 204B to servers 218 fail. For example, techniques are described that make use of a parent forwarding structure having a hierarchical tree organization. The forwarding structure, in some examples, may be a radix tree wherein each leaf node resolves to a subnetwork address. Router 204B may further generate sub-trees for sets of direct routes for which a common backup (e.g., indirect) route exists. For instance, router 204B identifies and groups a set of direct routes that have a common backup route. Router 204B then generates a separate forwarding sub-tree (e.g., direct route structure) for the resolving network traffic to individual prefixes within the group of routes. Each leaf node in the forwarding sub-tree specifies a next hop of one of the direct routes.

The forwarding structure resolves packet keying information, e.g., a destination address, a next hop entry of the forwarding structure associated with a subnetwork. Where multiple direct routes exist to a prefix associated with the destination, the next hop entry within the forwarding structure includes a reference to the corresponding sub-tree for further resolution of the keying information to next hop entries within the sub-tree that correspond to the direct routes. In addition to the reference to the sub-tree, the next hop entry within the parent tree contains an identifier for a next hop associated with the common backup route (or indirect route) for the group of routes. In the case of link failure or other topology change, the next hop entry in the parent tree is updated to identify the next hop for the common backup route as active over the next hop reference to the sub-tree. In this way, a the techniques provide for fast reroute for multiple routes for a network prefix associated with a common backup route, yet provide fine-grain next hop resolution for destinations within the prefix.

Techniques are now described with respect to FIG. 6. In accordance with techniques of the present disclosure, router 204B groups direct routes that share a common subnetwork together in a direct route structure. A forwarding structure includes entries that are each associated with different subnetworks. In accordance with techniques of the disclosure, an entry of the forwarding structure may reference a next hop list that specifies (1) the direct route structure associated with the subnetwork of the entry and (2) a corresponding indirect route that router 204B uses to route network traffic when a direct route fails.

Techniques of the present disclosure group direct routes together that share a common layer 2 subnetwork thereby enabling router 204B, upon determining that the common layer 2 network of the direct routes has failed, to quickly re-route network traffic using a corresponding indirect route. Grouping direct routes together that share a common subnetwork rather than associating each direct route with a corresponding indirect route may enable router 204B to re-route network traffic by updating a single next hop list associated the common subnetwork. In this way, techniques of the disclosure avoid updating multiple next hop lists associated direct routes by providing next hop lists that include one-to-many rather than one-to-one associations between each direct route and indirect route.

In the current example of FIG. 6, router 204B includes routing information that indicates direct routes from router 204B to servers 218 using network device 210 and indirect routes from router 204B to servers 218 using router external network 202 and router 204A. As shown in FIG. 6, router 204B is initially configured to route network traffic from end devices 200 to servers 218 using direct routes (e.g., direct route 208) that include network device 210 and physical links 208B and 214B. Router 204B may further be configured to route traffic using the indirect routes (e.g., indirect route 206) that include external network 202, router 204A, network device 210, and physical links 208A, 214B when a direct route fails.

In the current example, router 204B may determine a failure event (e.g., a physical link failure or router port failure due to error in the port, physical interface card (PIC), line card, etc.) that prevents network device 210 from transmitting network traffic between router 204B and servers 218. In response to such an event, router 204B determines that it can no longer send network traffic to servers 218 using direct routes specified by the direct route structure that is associated with the forwarding structure of router 204B. Consequently, when router 204B receives a network packet destined to, for example, server 218B, router 204B identifies in the forwarding structure an entry that is associated with a subnetwork that matches the destination network address of the network packet. Upon identifying the entry, router 204B selects the next hop list associated with the entry of the forwarding structure. Router 204B then configures the next hop list to use the indirect route 206 to forward the network packet to servers 218. By grouping direct routes that are associated with a common subnetwork together, router 204B may only be required to re-configure a single next hop list to re-route any network traffic destined to servers 218 in the event of a failure event. In this way, when the direct route 208 from router 204B to servers 218 fails, router 204B may quickly re-route network traffic using an indirect route.

Various embodiments of the invention have been described. These and other embodiments are within the scope of the following claims.

The invention claimed is:

1. A method comprising:
identifying, by a network device, a plurality of common direct routes to computing devices that are associated with a common indirect route to the computing devices, wherein the common direct routes are different routes than the indirect route;
generating, by the network device, a forwarding structure having a plurality of hierarchically arranged entries, wherein one of the entries within the forwarding structure is switchable between next hops of a next hop list, wherein the next hop list comprises: (1) a first reference that identifies a direct route structure, the direct route structure comprising a plurality of direct next hops associated with the common direct routes to computing devices, (2) and a second reference that identifies an indirect next hop associated with an indirect route to the computing devices;

configuring, by the network device, the one of the entries of the forwarding structure to use the direct route structure referenced by the next hop list to route network data to the computing device through the plurality of common direct routes;

forwarding, by the computing device, the network data according to the forwarding structure and the direct route structure; and responsive to determining that at least one of the common direct routes is no longer usable to forward the network data, performing a single update, by the network device, to the one of the entries of the forwarding structure to switch to using the indirect route referenced by the next hop list to re-route network data for all of the plurality of common direct routes to the single indirect route.

2. The method of claim 1, wherein the one of the entries within the forwarding structure is associated with a subnetwork address that matches at least a portion of each common direct route in the plurality of common direct routes.

3. The method of claim 1, wherein the forwarding structure comprises a radix tree, the radix tree comprising hierarchically arranged nodes, the hierarchically arranged nodes corresponding to values of network addresses, wherein a leaf node of the hierarchically arranged nodes is associated the subnetwork address that is associated with the one of the entries within of the forwarding structure.

4. The method of claim 2, wherein determining that at least one of the common direct mutes is not usable to forward the network data, further comprises:
determining, by the network device, whether a selector block indicates that a network route associated with the subnetwork address is not usable to route the network data, wherein the selector block indicates whether a physical link associated with the network route has failed.

5. The method of claim 2, wherein configuring the next hop list to use the direct route structure to route network data comprises:
setting, by the network device, an indicator associated with the next hop list to indicate the direct route structure is used to route network data.

6. The method of claim 2, further comprising:
selecting, by the network device, network prefixes of network addresses associated with network interfaces of the network device;
comparing, by the network device, the network prefixes to the plurality of direct network routes to determine whether at least one of the network prefixes matches a network address associated with a direct route that is included in the plurality of direct mutes;
when the at least one of the network prefixes matches the network address associated with the direct mute, determining, by the network device, whether at least a portion of the network address associated with direct route matches the subnetwork address; and
when at least the portion of the network address associated with the direct route matches the subnetwork address, associating, by the network device, the direct route with the direct route structure.

7. The method of claim 2, further comprising:
wherein the network device comprises a first network device;
receiving, by the first network device, the network data;
selecting, by the first network device, a key from the network data that indicates a network address associated with at least one of the computing devices;
determining, by the first network device, whether at least a portion of the network address matches the subnetwork address that is associated with the one of the entries within of the forwarding structure,
when at least the portion of the network address matches the subnetwork address that is associated with the one of the entries within of the forwarding structure, determining, by the first network device, whether the network route matches one of the plurality of direct mutes included in the direct route structure;
when the network route does not match one of the plurality of direct routes included in the direct route structure, selecting, by the first network device, a default route indicated in the direct route structure;
in response to selecting the default mute, sending, by the first network device, a message to a second network device using the default route to request a network route associated with the network address;
receiving, by the first network device, the network route; and
storing, by the first network device, the network route as a direct route in the direct route structure.

8. The method of claim 1, wherein the direct route structure comprises a radix tree, the radix tree comprising hierarchically arranged nodes, the hierarchically arranged nodes corresponding to values of network addresses, wherein a leaf node of the hierarchically arranged nodes is associated with a direct route of the plurality of common direct routes.

9. The method of claim 1, wherein configuring the next hop list to use the indirect route to route network data comprises:
setting, by the network device, an indicator associated with the next hop list to indicate the indirect route is used to route network data.

10. The method of claim 1, further comprising:
wherein the network device comprises a first network device;
determining, by the first network device, based at least in part on a network topology that describes a Local Area Network (LAN) further including the first network device and a second network device, whether the first network device and a second network device are associated with the same LAN;
when the first and second network devices are associated with the same LAN, determining, by the first network device, based at least in part on the network topology, whether a network route exists from the first network device to the computing devices that includes the second network device; and
when the network route exists from the first network device to the computing devices that includes the second network device, selecting, by the first network device, the network route as the indirect route to the computing devices.

11. The method of claim 1, further comprising:
wherein the network device comprises a first network device and wherein the first and second network devices are associated with different LANs;
receiving, by the first network device, a message from a second network device that indicates a network route that exists from the first network device to the computing devices that includes the second network device; and selecting, by the first network device, the network route as the indirect route to the computing devices.

12. The method of claim 2, further comprising:

wherein the forwarding structure comprises a first radix tree and the direct route structure comprises a second radix tree; and wherein a leaf node of the first radix tree is associated with a first portion of a network address specified by the network data, wherein the first portion of the network address is associated with the subnetwork address; and wherein a leaf node of the direct route structure is associated with a second portion of the network address that does not include the first portion of the network address, the leaf node of the direct route structure associated with one of the plurality of direct network routes.

13. A network device comprising:

a control unit having one or more hardware-based microprocessors;

a lookup module executable by the microprocessors, wherein the lookup module identifies a plurality of common direct routes to computing devices that are associated with a common indirect route to the computing devices, wherein the common direct routes are different routes than the indirect route;

wherein the lookup module generates a forwarding structure having a plurality of hierarchically arranged entries, wherein one of the entries within the forwarding structure is switchable between next hops of a next hop list, wherein the next hop list comprises: (1) a first reference that identifies a direct route structure, the direct route structure comprising a plurality of direct next hops associated with the common direct routes to computing devices, (2) and a second reference that identifies an indirect next hop associated with an indirect route to the computing devices;

wherein the lookup module configures the one of the entries of the forwarding structure to use the direct route structure referenced by the next hop list to route network data to the computing device through the plurality of common direct routes;

a forwarding unit to forward the network data according to the forwarding structure and the direct route structure; and wherein the lookup module, responsive to determining that at least one of the common direct routes is no longer usable to forward the network data, performs a single update to the one of the entries of the forwarding structure to switch to using the indirect route referenced by the next hop list to re-route network data for all of the plurality of common direct routes to the single indirect route.

14. The network device of claim 13, wherein the one of the entries of the forwarding structure is associated with a subnetwork address that matches at least a portion of each common direct route in the plurality of common direct routes.

15. The network device of claim 13, wherein the forwarding structure comprises a radix tree, the radix tree comprising hierarchically arranged nodes, the hierarchically arranged nodes corresponding to values of network addresses, wherein a leaf node of the hierarchically arranged nodes is associated the subnetwork address that is associated with the one of the entries of the forwarding structure.

16. The network device of claim 14, wherein the lookup module determines whether a selector block indicates that a network route associated with the subnetwork address is not usable to route the network data, wherein the selector block indicates whether a physical link associated with the network route has failed.

17. The network device of claim 14, wherein the lookup module sets an indicator associated with the next hop list to indicate the direct route structure is used to route network data.

18. The network device of claim 14, wherein the lookup module selects network prefixes of network addresses associated with network interfaces of the network device;

wherein the lookup module compares the network prefixes to the plurality of direct network routes to determine whether at least one of the network prefixes matches a network address associated with a direct route that is included in the plurality of direct routes;

wherein the lookup module determines, when the at least one of the network prefixes matches the network address associated with the direct route, whether at least a portion of the network address associated with direct route matches the subnetwork address; and wherein the lookup module associates, when at least the portion of the network address associated with the direct route matches the subnetwork address, the direct route with the direct route structure.

19. The network device of claim 14, wherein the network device comprises a first network device;

wherein the lookup module receives the network data;

wherein the lookup module selects a key from the network data that indicates a network address associated with at least one of the computing devices;

wherein the lookup module determines whether at least a portion of the network address matches the subnetwork address that is associated with the one of the entries of the forwarding structure;

wherein the lookup module determines, when at least the portion of the network address matches the subnetwork address that is associated with the one of the entries of the forwarding structure, whether the network route matches one of the plurality of direct routes included in the direct route structure;

wherein the lookup module selects a default route indicated in the direct route structure, when the network route does not match one of the plurality of direct routes included in the direct route structure;

wherein the lookup module sends, in response to selecting the default route, a message to a second network device using the default route to request a network route associated with the network address;

wherein the lookup module receives the network route; and wherein the lookup module stores the network route as a direct route in the direct route structure.

20. The network device of claim 13, wherein the direct route structure comprises a radix tree, the radix tree comprising hierarchically arranged nodes, the hierarchically arranged nodes corresponding to values of network addresses, wherein a leaf node of the hierarchically arranged nodes is associated with a direct route of the plurality of common direct routes.

21. The network device of claim 13, wherein the lookup module sets an indicator associated with the next hop list to indicate the indirect route is used to route network data.

22. The network device of claim 13, wherein the network device comprises a first network device;

wherein the lookup module determines based at least in part on a network topology that describes a Local Area Network (LAN) further including the first network device and a second network device, whether the first network device and a second network device are associated with the same LAN;

wherein the lookup module determines, based at least in part on the network topology, whether a network route exists from the first network device to the computing devices that includes the second network device, when the first and second network devices are associated with the same LAN; and wherein the lookup module selects the network route as the indirect route to the computing devices, when the network route exists from the first network device to the computing devices that includes the second network device.

23. The network device of claim 13, wherein the network device comprises a first network device and wherein the first and second network devices are associated with different LANs;

wherein the lookup module receives a message from a second network device that indicates a network route that exists from the first network device to the computing devices that includes the second network device; and wherein the lookup module selects the network route as the indirect route to the computing devices.

24. The network device of claim 14, wherein the forwarding structure comprises a first radix tree and the direct route structure comprises a second radix tree; and wherein a leaf node of the first radix tree is associated with a first portion of a network address specified by the network data, wherein the first portion of the network address is associated with the subnetwork address; and wherein a leaf node of the direct route structure is associated with a second portion of the network address that does not include the first portion of the network address, the leaf node of the direct route structure associated with one of the plurality of direct network routes.

25. A non-transitory computer-readable medium comprising instructions for causing one or more programmable processors to:

identify a plurality of common direct routes to computing devices that are associated with a common indirect route to the computing devices, wherein the common direct routes are different routes than the indirect route;

generate a forwarding structure having a plurality of hierarchically arranged entries, wherein one of the entries within the forwarding structure is switchable between next hops of a next hop list, wherein the next hop list comprises: (1) a first reference that identifies a direct route structure, the direct route structure comprising a plurality of direct next hops associated with the common direct routes to computing devices, (2) and a second reference that identifies an indirect next hop associated with an indirect route to the computing devices;

configure the one of the entries of the forwarding structure to use the direct route structure referenced by the next hop list to route network data to the computing device through the plurality of common direct routes;

forward network data according to the forwarding structure and the direct route structure; and responsive to determining that at least one of the common direct routes is no longer usable to forward the network data, perform a single update to the one of the entries of the forwarding structure to switch to using the indirect route referenced by the next hop list to re-route network data for all of the plurality of common direct routes to the single indirect route.

26. A network device comprising:

a control unit having one or more hardware-based microprocessors; and a lookup module executable by the microprocessors, wherein the lookup module identifies a plurality of Label Switched Paths (LPSs) associated with a common MPLS (Multi-protocol Label Switching) label space, the plurality of LSPs associated with MPLS labels that match portions of the MPLS label space, wherein an indirect LSP is associated with the plurality of LSPs, wherein the LSP is not associated with the portions of the MPLS label space;

wherein the lookup module generates a forwarding structure having a plurality of hierarchically arranged entries, wherein one of the entries within the forwarding structure is switchable between next hops of a next hop list, wherein the next hop list comprises: (1) a first reference that identifies a direct route structure, the direct route structure identifying the plurality of Label Switched Paths (LPSs) associated with a common MPLS label space, (2) and second reference that identifies the indirect LSP;

wherein the lookup module configures the next hop list to use the direct route structure to route network data;

a forwarding unit to forward network data according to the forwarding structure and the direct route structure; and wherein the lookup module, responsive to determining that at least one of the plurality of LSPs is no longer usable to forward the network data, performs a single update to the one of the entries of the forwarding structure to switch to using the indirect LSP referenced by the next hop list to re-route network data for all of the plurality of Label Switched Paths (LPSs) to the single indirect LSP.

* * * * *